Oct. 18, 1960
H. J. GREENBERG
2,957,153
RESISTANCE TEMPERATURE DETECTOR
Filed Aug. 12, 1959
FIG. 1
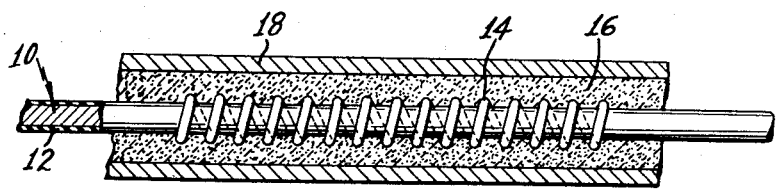
FIG. 2
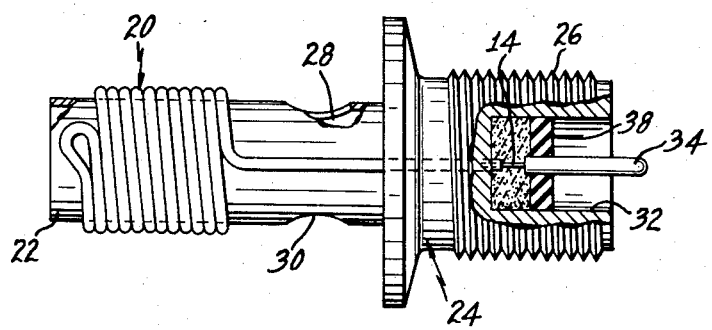
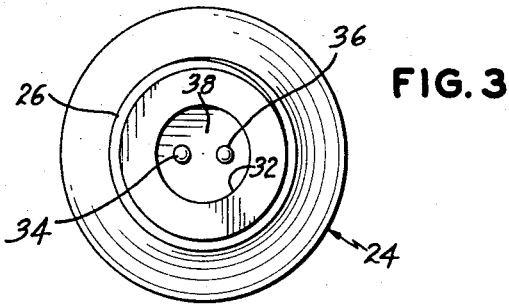
FIG. 3
INVENTOR.
HERBERT J. GREENBERG
BY *Karl Huber*
*James E. Bryan*
*Alan C. Rose*
ATTORNEYS 2,957,153
Patented Oct. 18, 1960

2,957,153
RESISTANCE TEMPERATURE DETECTOR

Herbert J. Greenberg, Livingston, N.J., assignor, by mesne assignments, to Engelhard Industries, Inc., Newark, N.J., a corporation of Delaware Filed Aug. 12, 1959, Ser. No. 833,316

14 Claims. (Cl. 338—28)

This invention relates to continuous temperature detection by means of electrical resistance sensing devices.

There is an increasing need for resistance temperature detectors having a fast response time in the order of two seconds or less and capable of withstanding and of operating under high-temperature and high-pressure conditions. As a specific example, this type of temperature measuring transducer is useful in nuclear reactors where the devices are exposed to pressures which range up to several thousand pounds per square inch.

Conventional resistance temperature sensing devices protrude probe-like into the flowing medium of which the temperature must be detected. Numerous designs exist in which a closed hollow casing sometimes termed "the well" is mounted to constitute the protruding probe, a resistance temperature sensing unit being mounted in the casing. These devices are not capable of meeting the requirements for both fast response and high-pressure resistance. In order to obtain satisfactory response speed, the "well" must have relatively thin walls. However, since the pressure inside the well is generally about atmospheric pressure, such a device is not capable of withstanding pressures in the above-mentioned range. Increasing the wall thickness of the well to impart mechanical strength to it reduces the response time so that the device is not practical for the application herein considered.

Accordingly, the principal object of the present invention is to sense the temperature of a flowing medium under extremely high-pressure conditions. Shortening response time of resistance temperature detectors and increasing the ruggedness of such units at high temperatures and pressures constitute collateral objects of this invention.

Another object of the invention involves the provision of a composite resistance wire assembly in bulk form for use in lengths according to specific requirements.

In accordance with one illustrative embodiment of the invention, a resistance temperature detector probe for sensing the temperature of a flowing medium makes use of a fine resistance temperature sensing wire which is helically wound around a wire core having an insulating surface. This subassembly of the core with the sensing wire is embedded into compacted refractory material and contained in a thin-walled tubing to form a composite cable of small diameter constituting the sensing unit. For sensing the temperature of a flowing medium, a desired length of the wire-shaped sensing unit with the inner helix of sensing wire is helically mounted on a cylindrical, hollow, thin-walled support, and this support is secured to or forms part of a suitable adapter to protrude probe-like into the medium of which the temperature must be detected. The free end of the protruding cylindrical support remains open and, in cooperation with it, additional openings in the cylinder wall located between the sensing unit windings and the adapter provide for continuous circulation and contact of the medium with the inner cylinder wall.

It will be understood that the term "resistance temperature sensing wire" used herein refers to wires of metals or alloys known in the art and having well defined characteristics required for measuring temperatures. Such characteristics include a high temperature coefficient of resistance, the stability of this coefficient after repeated changes of temperature, corrosion resistance, ductility, a melting point above the temperature range to be covered and many others. The metal or alloy employed must have a high specific resistance, and this fact excludes the use of ordinary wire material such as copper or silver. Suitable sensing wire materials are selected according to the requirements in each case, and specific examples are nickel for lower temperature ranges and platinum for high temperatures.

Since the pressurized medium flows around and through the supporting cylinder, no significant pressure difference may develop, and the wall thickness can be selected to permit extremely fast temperature conduction through it. With regard to the sensing unit in the form of the described composite wire, resistance against high-pressure is achieved by two distinct facts. In the first place, the wire core, generally anodized aluminum, magnesium or beryllium wire, considerably strengthens the sensing element. Additionally, the wire core reduces the amount of refractory material present in each unit of length, as compared to conventional thermoelectric devices in which helically wound wires are embedded in such powdered insulating environments. It has been found that, under extremely high pressures in the range of several thousand pounds per square inch, even compacted refractory powder may still be subject to reduction in volume, which fact can lead to failure or deterioration of the device. Furthermore, the presence of the wire core ensures stability of the sensing winding during the process of compacting which is achieved by swaging, die-drawing or the like, of the assembly, as described below. This factor is important when considering that by the use of the wire core the cross sectional dimensions of the sensing unit components, i.e. the core itself, the resistance winding, and the thickness of the refractory material, and therefore of the sensing unit itself, can be reduced to a minimum. Additionally, the risk of short circuiting or otherwise damaging the extremely small sensing winding during the compacting steps is practically avoided. In accordance with one design, the sensing unit, in the form of the described composite cable has a outer diameter of 0.06 inch or less for increased response speed and improved pressure resistance, since the resistance to pressure of tubes increases with decreasing dimensions. Therefore, a very thin outer tubing may be used. Thus a faster response combined with improved pressure resistance is obtained as compared with similar devices used heretofore.

In its broadest aspect, the invention provides a fast-response, high-pressure resistant unit for thermo-electrical devices which uses a resistance temperature sensing wire wound around a wire core with insulating surface. In accordance with one important feature of the invention, such a unit comprises a heat-resistant thin metal tubing, refractory material compacted in the tubing and, embedded in the refractory material, a wire core with an insulating surface having electrical resistance temperature sensing wire helically wound around it. Other features of this invention include the use of a thin-walled preferably cylindrical support to which the tubing is secured, an adapter for mounting the support in the wall of a container through which adapter the ends of the tubing are passed for connection with a registering equipment. As an additional feature ventilation openings are provided in the cylindrical support so that the pressures on both the inner and the outer surface are practically equal and insulation and heat transfer are improved. The invention, furthermore, includes a method for producing the sensing unit as described below.

Other objects, features and advantages of the invention will become apparent from a consideration of the following detailed description and from the drawings, in which:

Figure 1 is a longitudinal sectional view of one embodiment of a sensing unit;

Figure 2 is a side view, partially in section, of a resistance temperature detector probe using the sensing unit of Figure 1; and Figure 3 is a front view of the device of Figure 2.

Referring to Figure 1, the composite wire forming the sensing unit is shown in section and contains a wire core 10 with an insulating layer 12 thereon. In practice, the core may be formed of aluminum, magnesium, beryllium or other similar material which has been subjected to an anodizing treatment to form a layer of the corresponding oxide on its surface. Such treatments are well known in the art and may include electrolytic oxidation, chemical reaction or other suitable steps for producing a coherent, insulating layer of oxide on the wire surface. Alternatively, a wire of another metal such as copper or silver with an outer layer of one of the above mentioned metals may be subjected to an anodizing treatment for producing an insulating coating. A platinum wire 14 or a wire of any other metal or alloy having a suitable resistance temperature characteristic is helically wound around the wire core 10 and insulated therefrom by the oxide layer 12. The core 10 with the winding 14 is embedded in powdered, preferably compacted refractory material 16. Suitably, aluminum, magnesium, beryllium or zirconium oxide or a mixture thereof may be used. The assembly described is contained in a thin walled sheath 18 of stainless steel tubing to form a composite conductor or cable. When manufactured as a continuous strand, this composite conductor may be cut down to any desired length and used in assemblies according to specific requirements. Instead of stainless steel, nickel-chrome alloys containing iron known as "Inconel" or other heat resistant materials may be used for the tubing 18.

In Figures 2 and 3, a probe for resistance temperature detection is shown in which the above described composite conductor of Figure 1 is used as the sensing unit. Designated by the numeral 20, it is helically bifilar-wound around a hollow cylindrical thin walled sleeve or support 22 of heat-resistant metal and secured thereto, for example by silver-soldering. The support is secured to an adapter 24 provided with an external thread 26 so that it may be mounted in the wall of a container, pipe or the like to protrude into the flowing medium of which the temperature must be monitored. Suitably, and especially in applications where vibration fatigue has to be considered, the support 22 and the adapter 24 form one intergral unit. At its protruding end, the cylinder remains open and additional openings 28 and 30 adjacent the adapter 24 permit the medium to freely circulate through the support. As a result, no pressure difference can develop between inside and outside the support so that the wall thickness may be reduced to a minimum even in devices which, when performing, are subject to pressures of several thousand atmospheres.

The adapter is provided with a recess 32 which houses a pair of connector pins 34 and 36 for conveniently connecting the sensing wire to the registering equipment. Both ends of the sensing unit 20 are sealed through the adapter to terminate in the recess 32, and connection with the pins 34 and 36 may be made by any suitable conventional means such as the seal shown in the drawing. This includes an insulating plug 38 sealed into the recess 32 and supporting the pins 34 and 36, and a filling of insulating material through which the ends of the sensing wire 14 are passed to their respective connection points with the pins.

As pointed out above, the multiple purpose of the wire core 10 includes the reinforcing and stabilizing action during the preparation of the composite wire forming the sensing unit. Accordingly, the invention includes a method for producing such a composite wire. At first, the wire core is prepared by anodizing a wire of aluminum, magnesium or beryllium, or by coating a metal wire with an insulating layer in any other suitable fashion. After having wound the sensing wire around the core, it is inserted into beads formed from crushable refractory material, such as alumina, magnesia or beryllia. The subassembly so obtained is arranged in a thin-walled metal tubing by sliding it into the tubing. Subsequently, the diameter of the tubing is reduced to crush the refractory beads into a compacted powder, preferably by swaging, die-drawing or both. As mentioned above, good results have been obtained with a total diameter of the sensing unit of less than 0.06 inch, and units with diameters of about 0.04 inch have been used successfully.

It will be apparent that, even during the operation of crushing the refractory beads, the wire core acts as a backing to increase the effect obtained. In addition, the resistance winding is firmly maintained in its initial position so that its deformation and possible short-circuiting between discrete turns is avoided. This fact represents a definite advantage provided by the wire core inasmuch as, with the extremely small dimensions contemplated herein, the result achieved can not be obtained by known methods. As a further consequence of the small dimensions, the combined effect of fast response and resistance to high-pressures permit resistance temperature detection under circumstances where devices known until heretofore failed to properly perform.

It will be obvious to those skilled in the art that many more modifications may be made within the scope of the present invention without departing from the spirit thereof, and the invention includes all such modifications.

What is claimed is:

1. In a resistance temperature detector for sensing the temperature of a flowing medium under high-pressure and high-temperature conditions, a probe protruding into said medium, said probe including a hollow thin walled support, means for passing said medium along both the outside and the inner surface of said support, heat resistant thin metal tubing helically wound around said support, powdered refractory material compacted in said tubing, and a wire core with an insulating surface having resistance temperature sensing wire helically wound around it embedded in said refractory material.

2. A device according to claim 1 in which the diameter of the metal tubing does not exceed 0.06 inch.

3. In a resistance temperature detector for sensing the temperature of a flowing medium, a hollow thin-walled support, means for passing said medium along both the outside and the inner surface of said support, heat resistant thin metal tubing helically wound around said support, refractory material arranged in said tubing, and a wire core with an insulating surface having resistance temperature sensing wire helically wound around it embedded in said refractory material.

4. In a resistance temperature detector for sensing the temperature of a flowing medium, a cylindrical hollow thin-walled support mounted to protrude probe-like into said medium, heat-resistant thin metal tubing secured to said support, refractory material arranged in said tubing, and a wire core with an insulating surface having resistance temperature sensing wire wound around it embedded in said refractory material.

5. In a resistance temperature detector for sensing the temperature of a flowing medium, a cylindrical hollow thin-walled support adapted to be mounted to protrude probe-like into said medium, said support having apertures for permitting the passage of said medium through the support, heat resistant thin metal tubing helically wound around said support, refractory material arranged in said tubing, a wire core having an insulating surface, and resistance temperature sensing wire helically wound around said core, said core and resistance wire being embedded in said refractory material.

6. In a resistance temperature detector, a thin-walled support, heat-resistant metal tubing mounted on said support, refractory material arranged in said tubing and a filamentary core with an insulating surface having resistance temperature sensing wire helically wound around it embedded in said refractory material.

7. In a thermo-electrical device, an anodized wire core of a metal selected from the group consisting of aluminum, magnesium and beryllium having a resistance temperature sensing wire helically wound around it, refractory material embedding said core with said winding, and heat resistant thin metal tubing enclosing said refractory material.

8. In a thermo-electrical device, a wire core having an insulating surface, resistance temperature sensing wire helically wound around said core, refractory material embedding said core with said winding, and a heat resistant sheath enclosing said refractory material.

9. A probe for resistance temperature detectors, comprising a plug-like adapter for mounting in a container wall, a hollow cylindrical thin-walled sleeve axially secured to said plug along one cylinder end, the other, free cylinder end remaining open, at least one additional opening in said sleeve adjacent said adapter, heat-resistant metal tubing helically wound around and secured to said sleeve between the free cylinder base and said additional opening, powdered refractory material compacted in said tubing, an anodized wire core of a metal selected from the group consisting of aluminum, magnesium and beryllium having resistance temperature sensing wire helically wound around it embedded in said refractory material, and lead-in conductors connected to said sensing wire and insulatingly passed through said adapter.

10. As an article of manufacture useful in thermoelectric devices, heat-resistant thin metal tubing, powdered refractory material compressed in said tubing, and a filamentary core with an insulating surface having resistance temperature sensing wire helically wound around it embedded in said refractory material.

11. As an article of manufacture useful in thermoelectrical devices, heat resistant thin metal tubing, refractory material arranged in said tubing, and a wire core with an insulating surface having resistance temperature sensing wire helically wound around it embedded in said refractory material.

12. As an article of manufacture useful in high-pressure thermo-electrical devices, heat-resistant thin metal tubing, refractory material arranged in said tubing, and an anodized metal wire core selected from the group consisting of aluminum, magnesium and beryllium having resistance temperature sensing wire helically wound around it embedded in said refractory material.

13. In a method for manufacturing resistance wire assemblies, the steps comprising winding resistance temperature sensing wire around a filamentary core having an insulating surface, inserting said core with the sensing winding into beaded crushable refractory material, sliding the beaded refractory material into thin-walled metal tubing, and reducing the diameter of said metal tubing to crush said beaded refractory material into a compacted powder.

14. In a method of manufacturing resistance temperature sensing wire assemblies, the steps comprising subjecting to an anodizing treatment the surface of a wire core, said surface being formed of at least one metal selected from the group consisting of aluminum, magnesium and beryllium, winding resistance temperature sensing wire around said core, inserting said core with the sensing winding into beaded crushable refractory material, sliding the beaded refractory material into thin walled metal tubing, and reducing the diameter of said metal tubing to crush said beaded refractory material into a compressed powder.

References Cited in the file of this patent

UNITED STATES PATENTS

| | | |
|---|---|---|
| 2,485,950 | Wilson et al. | Oct. 25, 1949 |
| 2,494,628 | Oberding | Jan. 17, 1950 |
| 2,863,975 | Hebenstreit | Dec. 9, 1958 |